S. M. PALMER.
Improvement in Churns.

No. 123,289. Patented Jan. 30, 1872.

Witnesses
Jno. A. Ellis
Jas. V. White

Inventor
S. M. Palmer
Per
T. H. Alexander
Atty.

123,289

UNITED STATES PATENT OFFICE.

SUSAN M. PALMER, OF GREENE, NEW YORK.

IMPROVEMENT IN CHURNS.

Specification forming part of Letters Patent No. 123,289, dated January 30, 1872.

SPECIFICATION.

*To all whom it may concern:*

Be it known that I, S. M. PALMER, of Greene, in the county of Chenango and State of New York, have invented certain new and useful Improvements in Churns; and I do hereby declare that the following is a full, clear, and exact description thereof, reference being had to the accompanying drawing and to the letters of reference marked thereon which form a part of this specification.

The nature of my invention consists in the construction and arrangement of a churn in which the cream or milk is kept at the proper temperature while churning by the action of air, as will be hereinafter more fully set forth.

In order to enable others skilled in the art to which my invention appertains to make and use the same, I will now proceed to describe its construction and operation, referring to the annexed drawing, in which—

Figure 1:
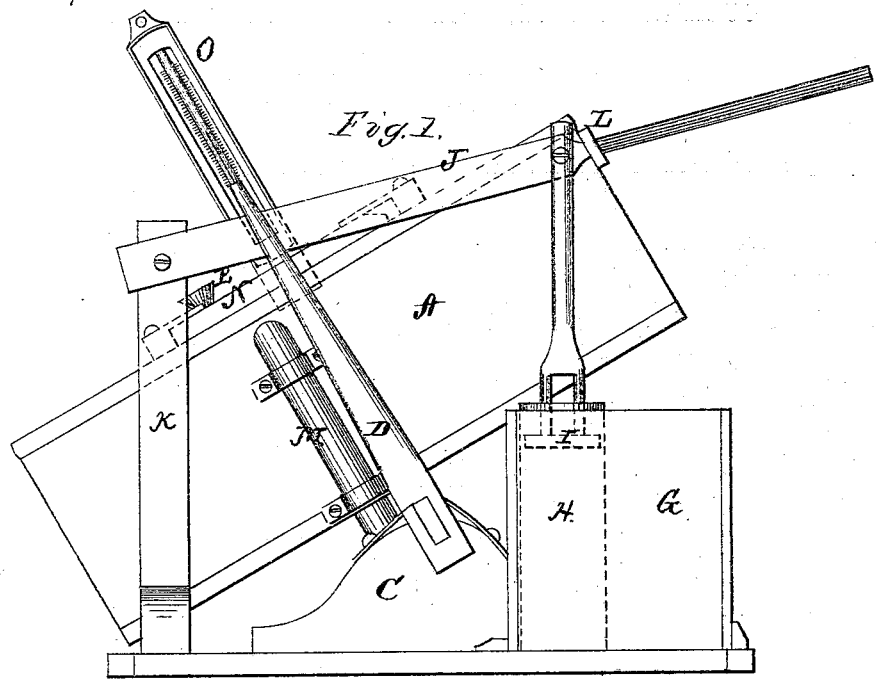
Figure 2:
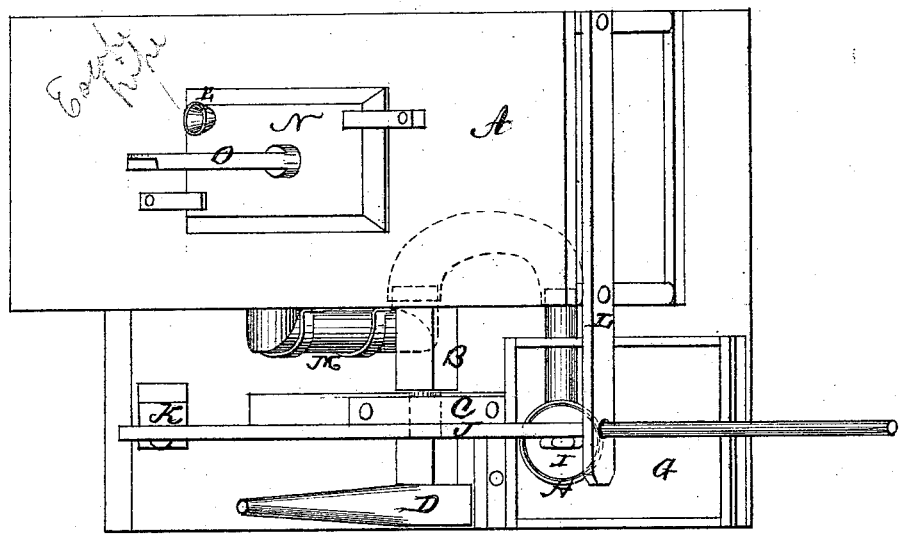

Figure 1 is a side elevation, and Fig. 2 a plan view of my churn.

A represents a box of any desired length and of about one-third the length in height and width. This box is secured to a rocking-shaft, B, under the center, which is supported upon two base-pieces, C C, of such a height that the box A may rock sufficiently to move the cream from one end of the box to the other with such violence as to cause the cream to be converted into butter by the action of its own weight. By this means the grain of the butter is kept from being injured, which it always is, more or less, by the action of dashers, where the cream is agitated only by the same. The box A is rocked back and forth by a lever, D, attached to the shaft B. To allow the gases arising from the cream during the process of churning to escape, I have provided the box A with an escape-pipe, E, which is constantly open, allowing said gases to escape as soon as formed, and thereby relieving the cream to a very great extent from its impurities. Upon the same stand on which the churn is placed is a tight box, G, containing the air-governor H. In this governor or cylinder operates a piston, I, the rod of which is pivoted to a beam, J. One end of this beam is pivoted to a standard, K, while the other end passes through a slot in an arm, L, attached to the end of the box A, and thus the movement of the churn is made to give to the piston I the necessary up-and-down motion. The box G is supplied with ice in warm weather and warm water in cold weather, for the purpose of cooling or warming the air in the governor H, as the case requires. From the said governor the air, thus cooled or warmed, is forced, by the action of the piston, through the pipe M into the churn, by which means the temperature of the cream may be kept at the desired degree, usually 62°, a thermometer, O, being attached to the lid N of the churn, thereby enabling the operator to know at what temperature the cream is during the churning. On the scale or index of the thermometer I have marked the words "for warming" and "for cooling" at 130° and 48°, respectively, which are the extremes for adding warm or cold water, as, if the cream is heated above 130°, the oil in the cream will melt, and not yield as much butter, while if cooled below 48° the sacs containing the oil will harden, and not only lessen the quantity of butter but also deprive it of its color. It is therefore of the utmost importance that the thermometer should be marked as above, that the operator may know how far it is advisable to add hot or cold water. The thermometer is placed in a case, and so arranged as to be readily taken out to be used elsewhere when not churning.

Having thus fully described my invention, what I claim as new, and desire to secure by Letters Patent, is—

1. The combination of a churn, an air-pump, H, and a thermometer arranged substantially as and for the purposes herein set forth.

2. The combination of the box G, air-cylinder H, pipe M, piston I, beam J, arm L, and rocking churn A, all constructed and arranged to operate substantially as and for the purposes herein set forth.

In testimony that I claim the foregoing as my own I affix my signature in presence of two witnesses.

SUSAN M. PALMER.

Witnesses:
CHAS. GRAY,
R. MACDONALD.